June 17, 1952   L. B. COLLINS ET AL   2,600,848
WIRE LINE STRIPPER

Filed April 1, 1947   2 SHEETS—SHEET 1

INVENTORS
LAWRENCE B. COLLINS
CLINTON A. LANGSTAFF
BY
Wilfred E. Lawson
attorney

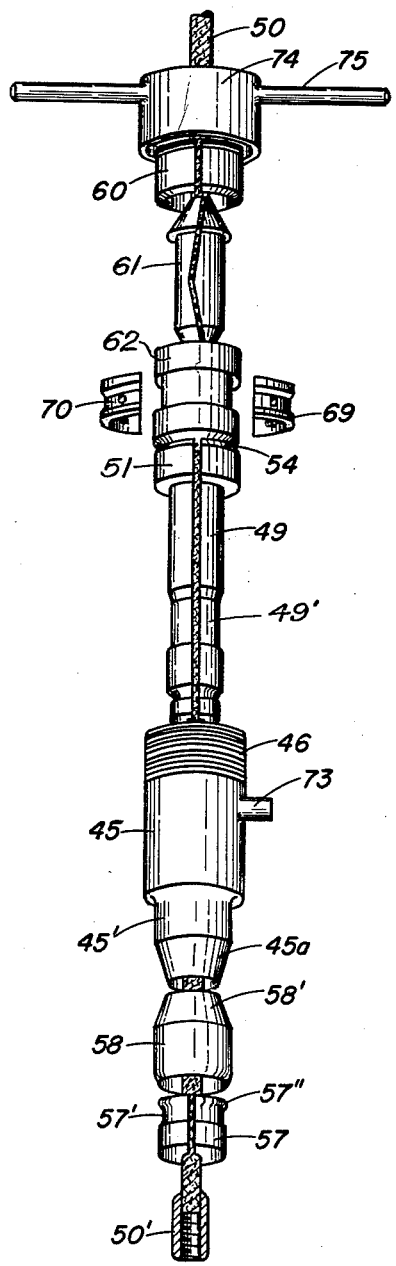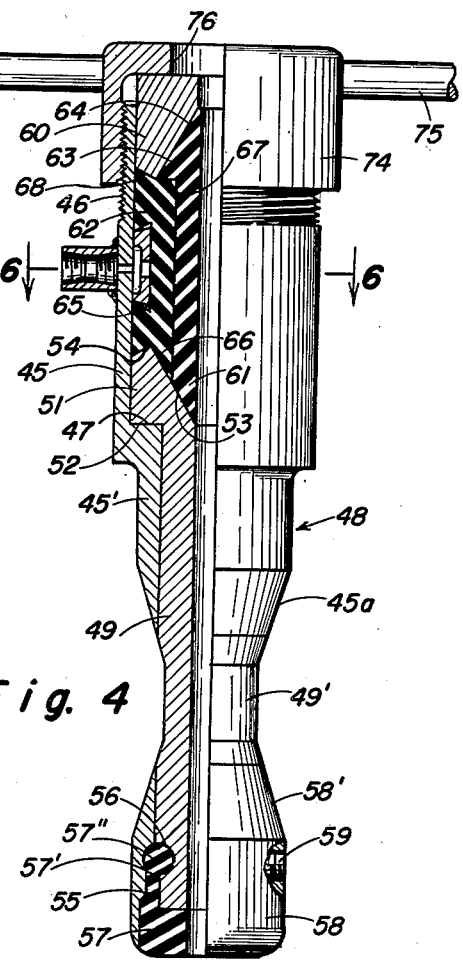

Patented June 17, 1952

2,600,848

UNITED STATES PATENT OFFICE 2,600,848

WIRE LINE STRIPPER

Lawrence B. Collins, Orange, and Clinton A. Langstaff, Compton, Calif.

Application April 1, 1947, Serial No. 738,758

4 Claims. (Cl. 166—14)

This invention relates generally to the class of well drilling and pertains particularly to improvements in line strippers.

The present application is a continuation in part of application Serial No. 590,902, filed April 28, 1945, which matured in Patent No. 2,465,848, March 29, 1949.

The present invention has for a principal object to provide a cable stripper designed in a novel manner to be held in position by an automatic rubber valve of known construction, to be readily removed to permit the complete instantaneous closing of such valve at the moment the swab or any other tool or wire or cable line is taken out or removed from the well tube.

Another object of the invention is to provide a cable stripper which when released or disengaged from the well packer or automatic rubber valve, will remain on the swab line.

A still further object of the invention is to provide a stripper device having a renewable rubber stripper or bushing through which the wire line or cable passes, which is of novel construction whereby it may be placed on the cable or wire line without having to draw the line and tools from the well, novel means being provided for maintaining an even pressure of the rubber stripper or bushing upon the cable or wire line whereby even contact of the bushing against the line is maintained and the bushing is caused to wear evenly.

Still another object of the invention is to provide a line stripper of the character stated wherein the parts are assembled in a novel manner facilitating the opening of the stripper structure for repair and replacement of parts and also facilitating the ready replacement of any worn section of the structure without having to discard the entire structure.

Still another object of the invention is to provide an improved wire line stripper of the character stated which is constructed in a novel manner to be releasably gripped and held in an automatic rubber packer or rubber valve whereby the application of pressure against the inner end of the stripper as, for example, by the contact of tool therewith, will effect the release of the stripper from the packer.

Still another object of the invention is to provide a wire line stripper of the character stated wherein the inner end of the stripper device is provided with a replaceable rubber bumper against which tools contact when the wire line carrying such tools is drawn outwardly through the stripper.

The invention will be best understood from a consideration of the following detailed description taken in connection with the accompanying drawings forming a part of the specification, with the understanding however, that the invention is not to be understood as limited to the exact details of construction shown and described since obvious modifications will occur to a person skilled in the art.

In the drawings:

Figure 4 is a view partly in elevation and partly in longitudinal section of a second embodiment of the stripper structure.

Figure 5 is an expanded or exploded view of the structure shown in Figure 4.

Figure 6 is a transverse section taken substantially on the line 6—6 of Figure 4.

Figures 1, 2, 3:
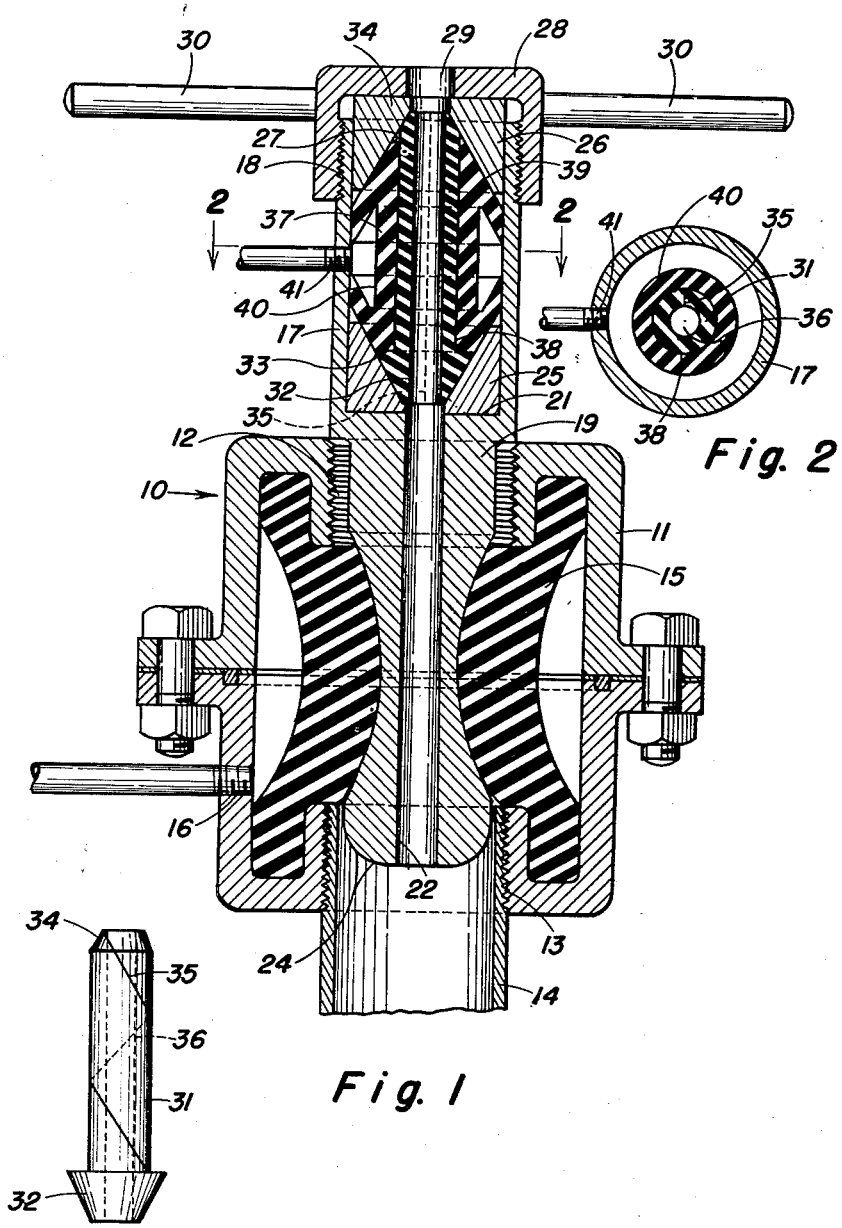
Figure 1 is a longitudinal section through one embodiment of the wire line stripper forming the present invention and through an expansible well packer of the type with which the stripper is designed for use and to which the stripper is shown applied.
Figure 2 is a transverse section taken on the line 2—2 of Figure 1.
Figure 3 is a view in side elevation of the removable stripper bushing.

The stripper tool constituting the present invention is designed primarily for use in connection with an expansible well packer of the character illustrated in the patent to Kilmer, Number 1,930,361, of October 10, 1933.

Figure 1 illustrates the application of one embodiment of the invention to the above referred to Kilmer expansible well packer or packer bushing, which bushing is generally designated 10. This packer or bushing comprises the casing head 11 which is in the form of a two part box having the upper and lower aligned openings 12 and 13 respectively, in the lower opening of which is secured the upper end of the well tube 14.

Within the head 11 is positioned the heavy rubber packing sleeve 15 which is caused to be constricted or compressed tightly about a cable, well pipe or other tool passing upwardly from the well tube through the head 11, by the introduction of suitable fluid under pressure through the opening 16 between the inner wall of the head and the tubular packing.

The embodiment of the present invention shown in Figures 1 to 3, comprises a relatively long steel body of circular cross section, generally designated 17, open at one end and exteriorly threaded as indicated at 18 and formed integral at its other end with the relatively long longitudinally extending stem 19, the over-all diameter of which is somewhat less than the over-all diameter of the steel body 17.

The body 17 is hollow or provided with the chamber 20 and the inner end wall 21 of this chamber, which forms an abutment for a part of the device as hereinafter described, has the central passage 22 opening therethrough, which passage passes entirely through the stem 19 as shown and provides a path for the steel well cable or rod.

Between its ends the stem 12 is cut away or of reduced outside diameter forming the encircling constricted area 23 and at the free end the corner of the stem is relatively widely rounded as indicated at 24. This rounded corner facilitates the extension of the stem through the packer sleeve 15 and when the fluid under pressure is introduced into the head 11 the packer sleeve 15 is caused to engage in the constricted area 23 and tightly grip the stem.

Within the chamber 20 there are located the brass rings 25 and 26, the opposing portions of which rings are of conical inside formation thereby providing the opposing seats 27.

The ring 25 rests upon the wall 21 while the outer ring 26 is maintained in position by the steel cap 28 which receives the outer end of the body 17 and is threadably coupled thereto in the manner shown. This cap is provided with a central opening 29 which is co-axial with the passage 22 and the cap carries the arms 30 by means of which it may be easily and quickly threaded into or removed from position.

The numeral 31 designates the renewable rubber stripper or flexible bushing. The lower end of this bushing is substantially conical as indicated at 32 to seat on the conical face 27 of the lower ring 25 and this conical lower portion 32 of the bushing is of an over-all diameter at its widest part, materially greater than the over-all diameter of the bushing so that there is thus formed a shoulder 33.

The opposite or upper end of the bushing 31 is merely beveled off as indicated at 34 to fit or conform with the taper of the conical seat 27 of the upper ring 26.

The bushing 31 is preferably made in one piece and is spirally split as indicated at 35 and the passage through the bushing, designated 36, is of a diameter less than the openings of the rings and adapted to substantially conform to the diameter of the cable or wire line which the bushing is designed to tightly encircle.

As will be readily apparent the bushing 31 is adapted to be applied to the cable or wire line without having to remove the device from the cable or from the engagement of its stem portion 19 in the expansible packer bushing.

Confined within the body 17 between the conical faces or surfaces 27 of the rings 25 and 26 is the annular pressure jacket which is generally designated 37. This annular jacket has the central or axial passage 38 to snugly receive the stripper bushing 31. The top and bottom surfaces of the jacket 37, are designated 39 and these surfaces are in outwardly convergent relation so that they will have a taper each corresponding to the taper of the seat 27 of the adjacent ring. Thus the taper at each end of the pressure jacket and the taper of the adjacent end portion of the stripper bushing correspond so that these two portions will seat firmly in the conical seat 27 of the adjacent ring and the entire unit may be firmly secured between the rings and held in place by the threaded cap 28.

The annular pressure jacket has formed therein the annular fluid receiving chamber 40 which opens through the outer side of the jacket and is of gradually increasing width toward the inner side. Since the outer side of the pressure jacket bears against the inner wall of the body 17, it will be seen that such wall closes the outer side of the fluid chamber 40 and there is introduced into this chamber, through a suitable opening as indicated at 41, a fluid under high pressure which causes the jacket to tightly compress the bushing 31 around the cable or wire line.

The brass retainer rings 25 and 26 help to eliminate sparks from the steel cable.

By the provision of the dovetail shaped fluid chamber 40 in the pressure jacket, when the pressure is built up in the chamber there is developed sufficient force at each end against the brass retainer rings to firmly press or feed the flexible rubber bushing into the line or cable contact space. The jacket is stretched over the bushing so that it will compress the bushing firmly around the cable and feed it inwardly along the tapered surfaces 27 of the brass ring, establishing a tight contact with the cable and also causing the bushing to wear evenly throughout its length.

Figures 4, 5 and 6 illustrate the second embodiment of the invention wherein it will be seen that the structure is made up of more parts and has certain additional features distinguishing it from the embodiment shown in Figure 1, although the general form and exterior appearance of the device is the same and, as will be readily apparent, it is adapted to be connected with the expansible packer shown in Figure 1, in the same manner as the first described embodiment.

In this second embodiment the stripper body is designated 45 and this, like the body 17, is of tubular form and is open at its upper end and provided with the external screw threads 46. The lower portion of the body 45 is of reduced diameter internally and externally as indicated at 45' and there is thus provided the internal shoulder 47 which supports a portion of the structure in the manner hereinafter described. This reduced portion 45' of the body constitutes a part of the constricted stem which is indicated as a hole by the numeral 48 and which in this embodiment is formed in three separate sections instead of a single section as in the first embodiment.

The numeral 49 designates the mandrel which is tubular and through which passes the wire line 50 as shown in Figure 5. This mandrel is constricted or of reduced diameter intermediate its ends as indicated at 49', the constricted portion 49' being tapered at each end at the same angle as and to conform to or join the tapered portion 45a of the reduced end of the body 45.

The upper part of the mandrel 49 is snugly incased in the reduced portion 45' of the body and at its upper end the mandrel is enlarged as indicated at 51 whereby is formed the downwardly facing shoulder 52 which rests upon the internal body shoulder 47 as shown in Figure 4.

Internally the upper end of the mandrel 49 is conical or funnel shaped as indicated at 53 and the upper end of this conical portion of the bore of the mandrel merges with the downwardly sloping top end wall or surface 54.

At its lower end the mandrel is of slightly reduced external diameter as indicated at 55 and the upper end of this reduced portion is defined by the encircling channel or groove 56. The numeral 57 designates a split rubber bumper of sleeve form which positions against the lower end of the mandrel 49 as shown in Figure 4, the internal diameter of the sleeve bumper being substantially the same as the diameter of the mandrel bore. This bumper has an upper portion 57' of enlarged internal diameter whereby the wall of the bumper sleeve is materially thin and this portion encircles the lower end of the mandrel around the reduced part 55. The thin portion 57' of the bumper terminates at its top edge in the rib 57'' which is substantially circular in cross section and forms a ring engaging in the groove or channel 56.

Encircling the lower end of the mandrel and the rubber bumper, and functioning to assist in maintaining the bumper in position, is the lock ring 58, the upper portion of which is externally tapered as indicated at 58' to merge with the adjacent tapered portion of the restricted part 49' of the mandrel. Thus it will be seen that the parts 45', 49 and 58 coact to form the completed stem 48 which has midway between its ends the relatively long constricted or reduced waist which is enclosed in and gripped by the rubber packer.

In addition to providing the channel 56 and a corresponding channelled portion 56' in the inner face of the lock ring 58, to maintain the bumper in place, use may be made of the securing or set screw 59, the principal function of which is, however, to secure the lock ring to the mandrel.

The overall diameter of the enlarged upper portion 51 of the mandrel substantially corresponds to the internal diameter of the upper part of the body 45 so that it fits snugly therein as shown in Figure 4. Coacting with this portion 51 of the mandrel and disposed in the top part of the body 45, is a retainer ring 60 between which and the part 51 of the mandrel are held the inner wiper rubber 61 and the outer sealing rubber 62.

As shown the wiper rubber 61 is of substantially the same form or design as the wiper 31 but in this second embodiment of the invention it is in inverted position in that the arrow shaped or tapered head 63 thereof is fitted in the downwardly flaring or conical portion 64 of the retaining ring through which the wire line 50 passes. The opposite or lower end of the wiper rubber is beveled or tapered to fit the conical inner surface 53 of the bore of the mandrel.

The sealing rubber is in the form of a sleeve having midway between its ends the encircling dovetail channel 65. This sealing rubber is of a diameter to fit snugly in the upper part of the body 45 and the bottom edge has a V-shaped channel 66 formed therein to receive the top edge of the head or top 51 of the mandrel whereby a portion of the sealing rubber lies between the face 53 and the wiper rubber and another portion lies upon the downwardly inclined top surface 54. A part of the top edge of the sealing rubber bears against the downwardly facing shoulder 67 of the wiper rubber head 63 and a portion of the top edge of the sealing rubber extends upwardly at an angle between a part of the retainer ring and the wall of the body 45, as indicated at 68.

Encircling the sealing rubber and lying in the channel 65 is the two part ring or lantern 69, the outer surface of which has the encircling channel 70. One of the parts of the lantern 69 has a passage 71 formed therethrough in the channel portion 70 and opening into the channel 70 of the lantern ring is a passage 72 which is formed through the wall of the body 45 and is in communication with the coupling nipple 73 which is fixed to the body as shown in Figures 4 and 6. This nipple provides for the attachment to the body of an air line whereby air or gas under pressure may be introduced into the channel 65 of the sealing rubber to effect the compression of the latter and of the wiper rubber so that the latter will be caused to grip the wire line.

As is clearly shown in Figure 5 the wiper rubber is longitudinally divided so that it may be opened or removal from or placement on the wire line without having to withdraw the line from the device.

Threadably engaged over the upper end of the body 45 is the cap 74, the same being provided with the radial arms 75 whereby its rotation for application or removal to the body, may be readily accomplished. This cap at its top is provided with a large aperture 76 which is of materially greater diameter than the passage through the wiper rubber, the mandrel and the retaining ring, so that no contact will be had between the wire line and the cap.

The device forming the present invention is in both of its embodiments designed to be used in connection with well perforators, water locating devices, surveys and like operations and it gives the users a chance to recover their tools if the well should go wild for a short period and push out their equipment too fast.

At the present time it is the practice to use two of the Kilmer packers or bushings but the rubber of such bushings is cut out in a very short time and causes leakage.

The wear on the wiper or stripper rubber is even throughout even after a considerable number of hours of use, because of the wedge-like action of the pressure jacket or sealing rubber which comprises the wiper rubber around the wire line.

It will be readily apparent from the foregoing that a device constructed in accordance with the present invention, when in use, will release automatically from the well packer when the swab tools are withdrawn and come into contact with the lower end of the stem 19 or 48 so that the bushing or packer 15 may close promptly after the passage of the swabbing tools and hold the pressure until the well control valve is closed. Consequently, it will be readily apparent that since the stem releases from the Kilmer packer all danger of the swabbing tools breaking off and falling down into the well when such tools come up against the stem, is avoided, whereas in other types of devices where such a release means is not provided, this undesirable breaking of the swabbing tools is likely to occur.

It will be noted that certain of the units of the stripper structure as illustrated in Figure 5, are split such, for example, as the retainer ring 60, the mandrel 49 and the bumper 57. The tool which is attached to the cable 50 is coupled to the cable by means of a socket 50'. By providing the parts 60, 49 and 57 with the longitudinal divisions shown, it is possible after separating the cap 74 from the body 45 and disengaging the bumper from the lower end of the mandrel, in the manner illustrated in Figure 5, to draw the cable and the socket through the various parts of the tool without having to remove the socket from the cable.

We claim:

1. A line stripper of the character stated, comprising a cylindrical housing open at one end and having an elongate tubular stem extending axially from the opposite end thereof and opening thereinto, said tubular stem comprising a portion of reduced inner diameter connected to the housing and forming a longitudinal extension of the housing and including an elongate tubular mandrel having one end extending through the housing extension into the housing and a ring encircling and secured to the other free end of the mandrel, adjacent portions of the ring and the housing extension being in spaced relation and of reduced external diameter and coacting with the mandrel to form the complete stem with a constricted portion intermediate its ends, the said one end of the mandrel within the housing being enlarged to fit snugly therein and having a seat formed in the said one end thereof, a ring disposed in the opposite end of the housing from the said one end of the mandrel, said last mentioned ring having a seat directed toward the seat in the mandrel, a tubular wiper member of resilient material interposed between the said one end of the mandrel and said last mentioned ring and having its ends formed to engage the adjacent seats, means for contracting the wiper around a wire line passing through the same, and a cap closing the said open end of the housing.

2. A line stripper of the character stated in claim 1, with a rubber bumper disposed against the said outer free end of the mandrel and enclosed by and maintained in position by said first mentioned ring.

3. A line stripper of the character stated, comprising a cylindrical housing open at one end and having an elongate tubular stem extending axially from the opposite end thereof and opening thereinto, said tubular stem being of reduced inner diameter and comprising a portion forming a longitudinal extension of the housing and including an elongate tubular mandrel having one end extending through the housing extension into the housing and a ring encircling and secured to the other free end of the mandrel, the adjacent portions of the ring and the housing extension being in spaced relation and of reduced outside diameter and coacting with the part of the mandrel therebetween to form the complete stem with a constricted portion intermediate its ends, the said one end of the mandrel within the housing being enlarged and secured therein, the mandrel being divided longitudinally into separable parts and having the said one end formed to provide a seat, a ring disposed in the opposite end of the housing from the said enlarged end of the mandrel, said last mentioned ring having a seat directed toward the seat in the mandrel, a split tubular wiper member of resilient material interposed between and having its ends formed to engage the said seats, means for contracting the wiper around the wire line passing through the same, and a cap closing the said open end of the housing.

4. A line stripper of the character stated comprising a cylindrical housing open at one end and having an elongate tubular stem extending axially from the opposite end thereof and opening thereinto, said tubular stem being of reduced inner diameter and comprising a portion forming a longitudinal extension of the housing and including an elongate tubular mandrel having one end extending through the housing extension into the housing and a ring encircling and secured to the other free end of the mandrel, the adjacent portions of the ring and the housing extension being in spaced relation and of reduced outside diameter and coacting with the part of the mandrel therebetween to form the complete stem with a constricted portion intermediate its ends, the said one end of the mandrel within the housing being enlarged and secured therein, means within the housing at the secured inner end of the mandrel forming a seat, a ring disposed in the opposite end of the housing from the said enlarged end of the mandrel, said last mentioned ring having a seat directed toward the seat in the mandrel, a tubular wiper member of resilient material interposed between and having its ends formed to engage the said seats, means for contracting the wiper member around the wire line passing through the same, a cap closing the said open end of the housing, said first mentioned ring having a portion remote from the said constricted portion of the stem, of an inside diameter materially greater than the outside diameter of the mandrel, the inner end of the said portion of the first mentioned ring and the adjacent portion of the mandrel having opposing coacting channels, a rubber bumper member disposed against the end of the mandrel adjacent to the first mentioned ring and having a sleeve portion encircling the mandrel between the latter and the enlarged portion of the first mentioned ring, and a rib formed integral with and around the inner end of the sleeve portion of the bumper and secured in the said coacting channels.

LAWRENCE B. COLLINS.
CLINTON A. LANGSTAFF.

REFERENCES CITED

The following references are of record in the file of this patent:

UNITED STATES PATENTS

| Number | Name | Date |
|---|---|---|
| 1,762,211 | Bradford | June 10, 1930 |
| 1,845,683 | Saunders | Feb. 16, 1932 |
| 1,930,361 | Kilmer | Oct. 10, 1933 |
| 2,465,848 | Collins et al. | Mar. 29, 1949 |